(12) United States Patent
Preston

(10) Patent No.: US 6,769,649 B2
(45) Date of Patent: Aug. 3, 2004

(54) RAM AIR PARACHUTE CANOPY WITH IMPROVED NOSE STRUCTURE

(75) Inventor: Daniel Preston, Kew Gardens, NY (US)

(73) Assignee: Atair Aerospace, Inc., Brooklyn, NY (US)

( * ) Notice: Subject to any disclaimer, the term of this patent is extended or adjusted under 35 U.S.C. 154(b) by 0 days.

(21) Appl. No.: 10/315,459

(22) Filed: Dec. 9, 2002

(65) Prior Publication Data

US 2003/0183724 A1 Oct. 2, 2003

Related U.S. Application Data

(60) Provisional application No. 60/341,055, filed on Dec. 7, 2001, and provisional application No. 60/340,993, filed on Dec. 7, 2001.

(51) Int. Cl.[7] .............................................. B64D 17/02
(52) U.S. Cl. ..................................................... 244/145
(58) Field of Search ................................ 244/142, 145, 244/147, 138 R

(56) References Cited

U.S. PATENT DOCUMENTS

| | | | | |
|---|---|---|---|---|
| 3,504,874 A | * | 4/1970 | Lemoigne | |
| 3,524,613 A | * | 8/1970 | Reuter et al. | |
| 3,724,789 A | * | 4/1973 | Snyder | |
| 4,705,238 A | | 11/1987 | Gargano | 244/145 |
| 4,930,727 A | * | 6/1990 | Coe | |
| 5,069,404 A | * | 12/1991 | Bouchard | |
| 5,082,210 A | * | 1/1992 | Morehead | |
| 5,102,071 A | | 4/1992 | Rieleit | 244/152 |
| 5,174,529 A | | 12/1992 | Jalbert | 244/145 |
| 5,201,482 A | * | 4/1993 | Ream | |
| 5,967,463 A | * | 10/1999 | Payne | |

OTHER PUBLICATIONS

International Search Report for PCT/US02/39520 mailed on Sep. 3, 2003.

* cited by examiner

*Primary Examiner*—Tien Dinh
(74) *Attorney, Agent, or Firm*—Mintz, Levin, Cohn, Ferris, Glovsky and Popeo, P.C.

(57) ABSTRACT

The ram air parachute has restrictions on the inlets to the cells to reduce drag during flight and to reduce opening forces. The restrictions include triangular sections blocking portions of the inlets. The triangular sections may be positioned at loaded and non-loaded ribs. Furthermore, the triangular sections are dimensioned to tension the top skin between the loaded ribs and non-loaded ribs to preserve an aerodynamic shape during flight without cross-bracing. The loaded ribs may be shortened to create a zig-zag pattern at the front edge of the bottom skin for improved deployment with reduce drag during flight.

8 Claims, 5 Drawing Sheets

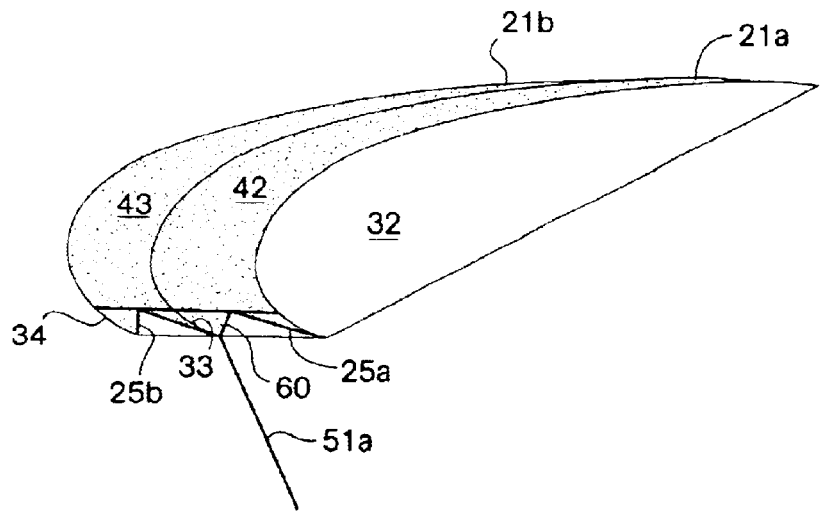
Fig. 6
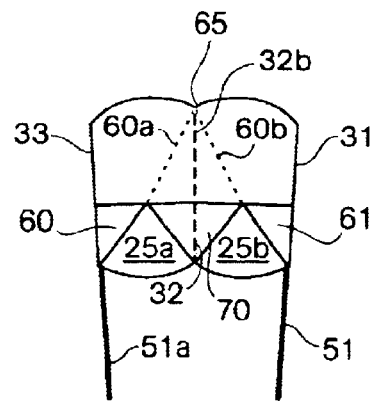
Fig. 7
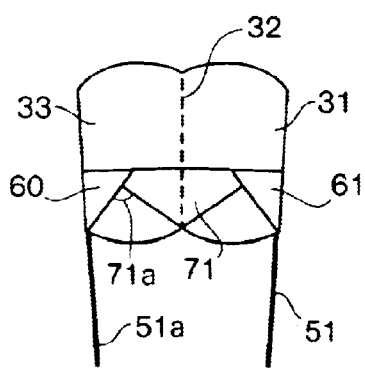
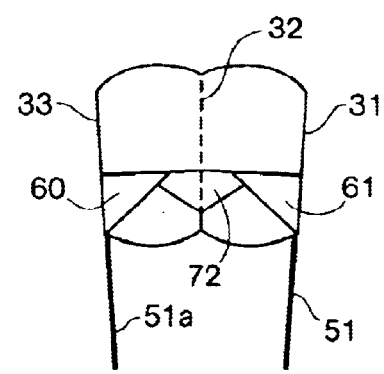
Fig. 8          Fig. 9

RAM AIR PARACHUTE CANOPY WITH IMPROVED NOSE STRUCTURE

This application claims the benefit of U.S. Provisional application No. 60/341,055 filed Dec. 7, 2001 and claims benefit of Ser. No. 60/340,993 filed Dec. 7, 2001.

BACKGROUND OF THE INVENTION

1. Field of the Invention

The present invention relates to ram air parachutes and more particularly to ram air parachutes having an improved canopy design.

2. Discussion of Related Art

Parachutes have evolved over the years into highly sophisticated systems, and often include features that improve the safety, maneuverability, and overall reliability of the parachutes. Initially, parachutes included a round canopy. A skydiver was connected via a parachute harness to the canopy by suspension lines disposed around the periphery of the canopy. Such parachutes severely lacked control. The user was driven about by winds with little mechanism for altering direction. Furthermore, such parachutes had a single descent rate based upon the size of the canopy and the weight of the parachutist. They could not generate lift and slowed descent only by providing drag.

In the mid-1960's the parafoil canopy was invented. Since then, variations of the parafoil canopy have replaced round canopies for most applications, particularly for aeronautics and the sport industry. The parafoil canopy, also known as a ram air canopy, is formed of two layers of material—a top skin and a bottom skin. The skins may have different shapes but are commonly rectangular or elliptical. The two layers are separated by vertical ribs to form cells. The top and bottom skins are separated at the lower front of the canopy to form inlets. During descent, air enters the cells of the canopy through the inlets. The vertical ribs are shaped to maintain the canopy in the form of an airfoil when filled with air. Suspension lines are attached along at least some of the ribs to maintain the structure and the orientation of the canopy relative to the pilot. The canopy of the ram air parachute functions as a wing to provide lift and forward motion. Guidelines operated by the user allow deformation of the canopy to control direction and speed. Ram air parachute canopies have a high degree of maneuverability.

Canopies are flexible and stretchable membrane structures, they distort based upon mechanical and aerodynamic tensions, stresses, airflows and pressure distribution. Although a cell is modeled as having a basically rectangular cross section, when inflated the shape distorts towards round with complex distortions. Under canopies of conventional design, the leading edge or nose of the ram air parachute is deformed during flight as is the top profile of the airfoil between the ribs. Additionally, with forward motion, the head-on wind overcomes the internal pressurization of the canopy, and deforms the nose of the canopy. This distortion blunts the nose of the airfoil or even indents it, impairing the aerodynamics of the parachute wing. The parachute flies less efficiently as a result. Therefore, a need exists for a ram air parachute canopy which reduces nose distortion and spanwise topskin distortion.

Inlets are required to inflate and pressurize the canopy to maintain its wing shape. However, the inlets are also the greatest source of drag on the wing which slows forward movement and reduces efficiency. The carrying capacity and glide ratio of the canopy would be improved if this drag could be reduced. Therefore, a need exists for a canopy with reduced drag from the cell inlets.

Typically, in a ram air parachute, suspension lines are attached to every other rib, thus creating loaded ribs (i.e., ribs to which suspension lines are attached) and non-loaded ribs (i.e., ribs which do not have suspension lines attached thereto). The different stresses on the loaded and non-loaded ribs also distorts the cell shape. FIG. 1 illustrates a cross section of a portion of a typical ram air parachute canopy 500 during flight. FIG. 1 shows two cells formed of parts 501, 502, 503, 504, with three loaded ribs 510, 511, 512 and two non-loaded ribs 521, 522. Suspension lines 541, 542, 543 are attached to the loaded ribs 510, 511, 512. The top skin 530 and bottom skin 531 tend to arc between the ribs during inflation. Also, the non-loaded ribs 521, 522 tend to be higher than the loaded ribs 510, 511, 512, which provides a distortion along the span of the canopy. The distortion is aerodynamically undesirable and reduces the efficiency and performance of the canopy.

In order to keep the loaded and non-loaded ribs level and to improve upon the aerodynamics of the canopy, cross-bracing between ribs has been added to some canopy designs. Cross bracing is the use of diagonal ribs in addition to vertical ribs to create more loaded rib—top skin junctions without adding more lines which increase drag and possible deployment malfunctions. Perfection of the top profile of the airfoil is far more important aerodynamicly than the bottom profile. U.S. Pat. No. 4,930,927 illustrates such a design. Cross-braced designs suffers from a number of drawbacks. Cross-bracing results in very complicated construction, high manufacturing costs, and increased packing volume. The standard cross braced design is a 'tri cell' construction with a packing volume approximately 25% larger than an equivalent non-cross braced design. A cross section of a tri-cell canopy is illustrated in FIG. 2. Furthermore, the increased rigidity induced by the cross-bracing creates higher opening forces for the pilot. Typically, large cross porting is used on all of the cells to reduce pack volume, which does nothing to slow the canopy's inflation on deployment. The opening forces can be so severe that they can jar the jumper's body causing discomfort and even injuries. Although designers have implemented "formed" noses, larger sliders, moved bridal attachment points and modified line trims to try to soften the openings of such cross-braced canopies, it has generally yielded limited improvement.

Sliders used to counteract the large opening forces on a cross-braced canopy often cause premature wear on the suspension lines of the canopy. A slider is a rectangular piece of material with a grommet at each corner. Grouped suspension lines pass through each grommet. When the parachute opens, the force of the opening canopy and separating suspension lines forces the slider down the suspension lines. Air resistance tends to slow movement of the slider and, hence, restrict opening of the canopy against the spreading force of the inflating canopy pushing the slider down. The most force on the slider comes from the lines to the outermost cells, which pushes the slider down rapidly caused friction heat. The heat changes the dimension of many standard types of lines (e.g., Spectra, dyneema brand lines). It is not uncommon for outer lines to change in dimension as much as five inches in only a couple of hundred jumps. Accordingly, cross braced canopies are almost exclusively supplied with Aramid based lines (e.g., Kevlar, Vectran, etc.). These lines do not change dimension with the generated slider-friction heat solving the problem stated above, but suffer from micro-fiber cracking. Accordingly, if over jumped, Aramid lines can break catastrophically with no warning.

Prior art canopies have included formed noses with shaped inlets to limit opening forces. FIGS. 3 and 4 illustrate two prior art canopy designs having a formed nose. FIG. 3 illustrates a tri-cell design with an formed nose having an oval inlet 801 by a loaded rib 802. Reinforcing tape 803 is sewn around the oval shape of the nose. FIG. 4 illustrates a formed nose created by extending the top skin 810 and bottom skin 811 around the nose of the canopy to create shaped inlets 812. Again, reinforcing tape 813 is sewn to the inlet edges. While the fabric tape on the inlet edges of the formed noses in these designs limits wear, the canopy is still subject to span-wise stretching. The entire span of the canopy will stretch during flight and span wise distortion of the nose occurs due to the different stresses on loaded and non-loaded ribs. All prior art canopies with formed noses place the open inlets over a loaded rib. This creates a geometry which, during deployment, presents scoops for inrushing air. The scoop shape results in large opening forces and in substantial drag during flight.

Accordingly, there is a need for an improved parachute airfoil design which provides ram air parachutes with lower spanwise distortion without using crossbraces and with restricted inlet area for softer openings. Furthermore, a need exists for a canopy design which limits distortion and stretching at the leading edge for improved aerodynamics with formed nose inlets. A need exists for a packable canopy design which provides improved aerodynamics with limited packing volume

SUMMARY OF THE INVENTION

The deficiencies of the prior art are substantially overcome by the canopy design of the present invention which reduces spanwise distortion on the top skin without using cross braces. According to one aspect of the invention, the size of the inlets are changed to reduce drag on the canopy and control the conductance of air inflating the parachute during deployment. according to a first embodiment of the invention, triangular pieces of material are attached to the front edge of the top skin at each of the loaded ribs. The triangular material reduces the inlet size and thus drag on the canopy during flight. The triangular material also tensions the top skin between the loaded ribs and the non-loaded ribs to reduce spanwise distortion. With the addition of this triangular patch on the nose at each rib inlet pack volume is increased by only a miniscule amount, but tension is now transmitted from the suspension line-loaded rib junction through the patch and its reinforcing tape to the top skin of the canopy cell greatly reducing the spanwise distortion of the nose. The distortion is reduced to the same amount present with crossbracing only at the nose of the wing and then tapers back to a usual amount about ⅓ of the way back on the airfoil. Aerodynamically this is the most important portion of the wing. With equal dimensioned triangle patches on both the loaded and non loaded ribs the non-leaded rib triangles will not tension in the same way than at the loaded ribs and tend to remain slack. Such a design performs well over prior art but can be further improved by changing the shape of the nonloaded triangles to have a broader angle off the vertical rib so as to overlap with the loaded rib triangles. In this way side they are side tensioned from the loaded rib triangle edges.

According to a second embodiment of the present invention, triangular pieces of material are added to the front edge of the top skin at the loaded and non-loaded ribs. According to another embodiment of the present invention, the top or bottom skin of the canopy are modified to provide the shape of the triangular pieces of material of the other embodiments. The edges of the formed inlet opening are reinforced with woven fabric tape. The resulting configuration looks akin to a triangulated reinforced truss.

According to a third embodiment of the a line attachment points of the canopy are set back slightly from the nose of the canopy and the bottom skin is cut with a zig-zag or scalloped edge. In this embodiment, the additional inlet area is formed that is only presented during deployment when the relative wind is from below. Once inflated with the canopy in gliding flight the relative wing is from slightly below head on. Prior art canopies use inlets that when their area is projected in the direction of the relative wind have more projected inlet area during flight than during opening. this is reversed from ideal in that more inlet area is required for opening than is required to keep the canopy pressurized for flight. Any additional inlet area than required for flight is simply additional drag. By undercutting the bottom skin the inventive method can ensure proper deployment of canopies with very low drag restricted inlets for flight.

According to another aspect of the invention, a continuous reinforcing fabric tape is attached to the top skin of the canopy along the leading edge above the inlets. According to another aspect of the invention, the trailing edge of the top skin is also reinforced with fabric tape.

FIG. 6 is a perspective view of portions of two cells of a ram air parachute according to an embodiment of the present invention;

FIG. 7 is a front view of a portion of a ram air parachute according to a first embodiment of the present invention;

FIG. 8 is a front view of a portion of a ram air parachute according to a second embodiment of the present invention;

FIG. 9 is a front view of a portion of a ram air parachute according to a third embodiment of the present invention.

DETAILED DESCRIPTION OF PREFERRED EMBODIMENTS

Figure 5:
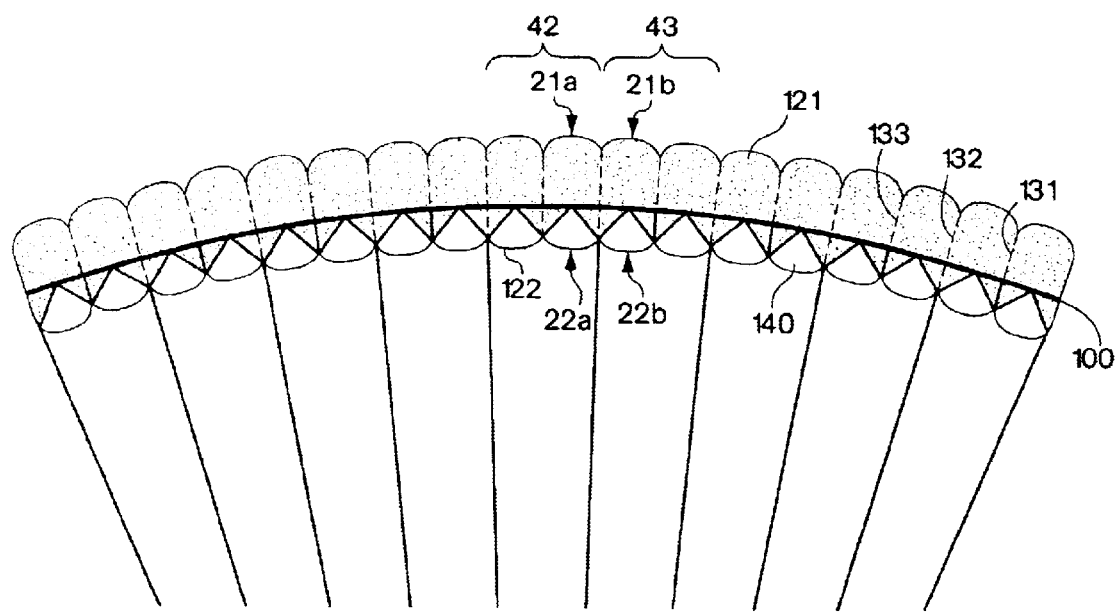
FIG. 5 is a front view of a ram air parachute according to an embodiment of the present invention.

FIG. 5 is a front view of a ram air canopy according to an embodiment of the present invention. The canopy has a top skin 121, bottom skin 122, and a plurality of vertical ribs 131, 132, 133. The top skin 121 and bottom skin 122 are separated at the leading edge to form inlets 140 for the cells of the canopy. FIG. 6 illustrates parts of two cells 42, 43 of the canopy according to a first embodiment of the present invention. Each portion 42, 43 is formed by a portion of the top skin 21a, 21b, a portion bottom skin 22a, 22b, and two vertical ribs 32, 33, 34. The top skin 21 and bottom skin 22 are partially open at the front edge of the canopy to provide an inlet. A triangular member 60 is attached between the bottom skin 22 and the top skin 21 at the loaded rib 33. Additional triangle members 70a, 70b are attached between the top skin 21 and bottom skin 22 at the non-loaded ribs 32, 34.

The triangular pieces 60, 70a, 70b creates two reduced size inlets 25a, 25b between themselves, the top skin 21 and the bottom skin 22. The triangular members 60, 70a, 70b may be a separate piece attached to a front edge of the top skin 21 or may be formed as an extension of the top skin 21. FIG. 7 is a front view of a cell between loaded ribs 31, 33 according to the first embodiment of the present invention. FIG. 7 illustrates the angles of the triangular members 60, 61 and tensioning along imaginary lines 60a, 60b on the canopy when inflated. As is typical of the airfoil shape of the ram air parachute, the top skin 21 extends up from the inlet at the front edge. The non-loaded rib 32 is positioned between the two inlet portions 25a, 25b. Line 32b illustrates the position of the non-loaded rib 32 attached to the top skin. The triangular members 60,61 extend part of the way along the leading edge of the top skin 21 from the loaded ribs 31, 33 to the non-loaded rib 32. Preferably, the triangular members 60, 61 are dimensioned so that the edge facing the inlet portions 25a, 25c are tensioned when the canopy is inflated. Furthermore, the triangular members are dimensioned so that the top skin is also tensioned along lines 60a, 60b from a top point 65 of non-loaded rib 32. The tensioning of the triangle member 60, 61 and top skin 21 restricts upward motion of the non-loaded rib relative to the loaded rib, without the use of cross bracing. A second triangle member 70 is positioned in front of the non-loaded rib 32. The second triangle member 70 is dimensioned so that the upper two vertices meet the top skin at the same location as the vertices of the first triangle members 60, 61. As with the first triangle members 60, 61, the second triangle member may be formed as a separate piece attached to the front edge of the top skin or as an extension of the top skin. According to the first embodiment of the present invention, the second triangle member 70 is dimensioned to reduce the inlet without changing the tensioning of the first triangle members 60, 61 or the top skin 21. The improved nose structure of the present invention has aerodynamics similar to that of cross-braced canopies without the added weight or packing volume.

A second embodiment of the present invention is illustrated in FIG. 8. As in the first embodiment, the second embodiment of the present invention includes triangle members 60, 61 for limiting the inlet and for tensioning the top skin 21 to maintain an aerodynamic shape. The second embodiment further includes second member 71 disposed in front of the non loaded rib. The second member 71 is in the form of a non-regular pentagon or simply overlapping triangles with broader angles from the vertical rib. The edges of the second member 71 from the lower skin 22 connect to the first triangle member 60, 61 at points below the front edge of the top skin 21. As with the other embodiments of the present invention, the second member 71 can be formed as a separate piece attached to the top skin 21 or as an extension of the top skin 21. Additionally, the second member 71 and the first triangle members 60, 61 may be formed as a single piece and jointly attached to the front edge of the top skin 21. The second member 71 is dimensioned so that additional tension is provided between the first triangle members 60, 61 and the bottom skin 22 at the non-loaded rib 32. The extra tensioning provided by the second member 71 helps maintain the aerodynamic shape of the nose of the canopy.

FIG. 9 illustrates a third embodiment of the present invention. In the third embodiment, the vertex of the triangle member 72 at the non-loaded rib is set back from the bottom skin. This allows additionally tensioning of the non-loaded triangle and the nose of the canopy and an increased inlet area.

Inventive canopies have been constructed where the upper edge of the triangles are stitched along the length to the top skin and the apex or downward point is attached not to the bottom skin, but to the edge tape of the vertical rib using a bar tack.

The embodiments of the invention as set forth above disclose members for limiting the inlets to cells of the ram air parachute. All of the members disclosed in these embodiments have substantially straight edges reinforced with tape. The objectives of the members are to tension the nose and top to maintain an aerodynamic shape lower in distortion and to restrict the inlet area. The improvement realized in the present invention is an increased efficiency of the canopy, and an increased ability to control the inflation of the canopy for reduce opening shock. In addition, using the nose-patterned modification on a standard canopy allows the canopy to fly faster since the drag on the nose is greatly reduced and greatly increased efficiency and max wingload capabilities. Canopies of the inventive design have been flown up to ten pounds per square foot and landed up to 4.5 pound per square foot.

Figure 10:
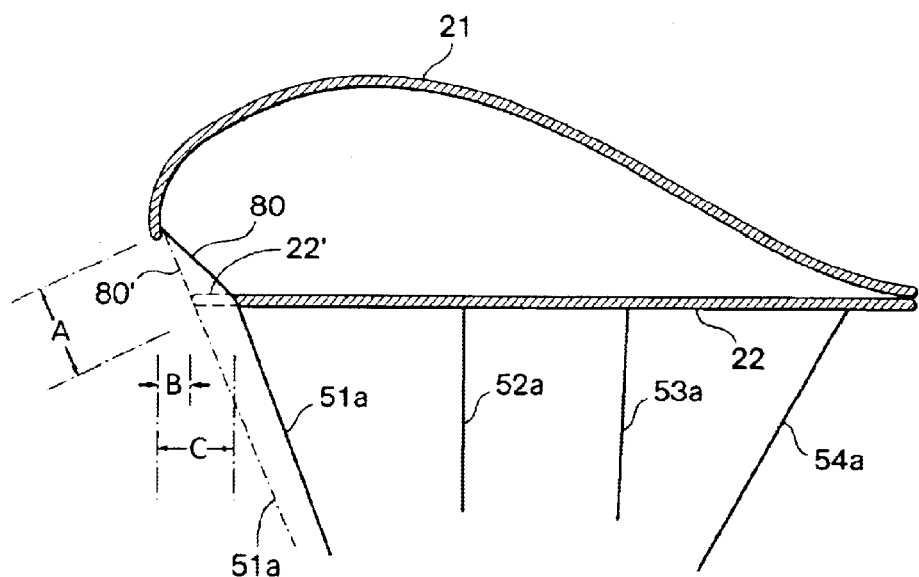
FIG. 10 is a side cross sectional view of the canopy according to an embodiment of the present invention.

The triangular members 60, 61 reduce the area of the inlet which reduces drag on the parachute during flight. The reduced inlets also limit entry of air in the cells during deployment, which slows deployment and limits opening forces. However, deployment may be excessively slowed. FIG. 10 illustrates the effective projected area of the inlet in both flight (A) and deployment (B). The dotted lines in FIG. 10 represent the bottom skin 22', suspension line 51a', and inlet 80' for a standard canopy. The effective inlet area (B) during deployment, when the parachute if falling is much smaller than the effective inlet area during flight (A) when the parachute is moving forward. When the inlet area is reduced as in the present invention in order to reduce drag during flight, it may become too small for efficient deployment. In a fourth embodiment of the present invention, the suspension line 51a and bottom skin 22 are moved back from the front edge of the canopy. This embodiment of the invention is represented by the solid lines in FIG. 9. The modification increases the effective area (C) of the inlet during deployment without substantially changing the effective area during flight. Accordingly, the canopy can be efficiently deployed and flown.

Figure 11:
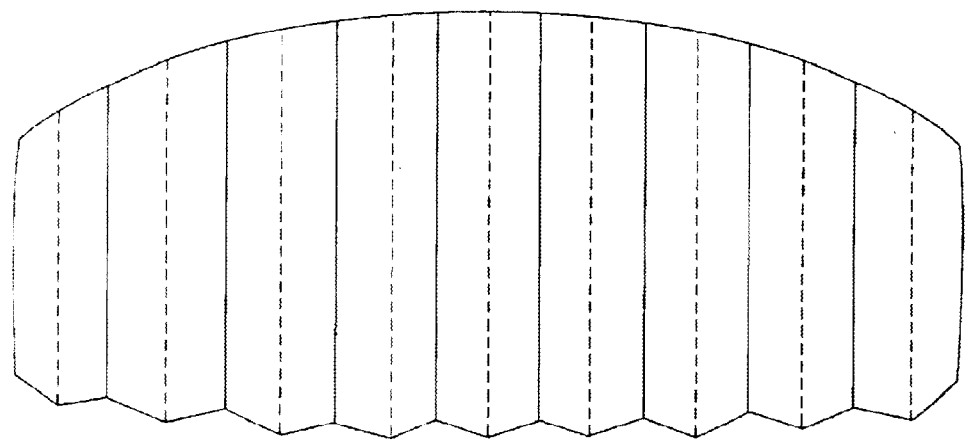
FIG. 11 is a bottom view of the canopy according to an embodiment of the present invention.

The design of the present invention, creates a zig-zag front edge to the bottom skin 22 as illustrated in FIG. 11. The difference between the loaded and non-loaded ribs varies depending on the intended design. Inventive sport canopies have been made with an offset of 1", but offsets may be in the range of 1" to 3", or even up to 6". Existing ram air canopies have more projected area for flight than for deployment, which is opposite what is needed for deployment and flight of the parachute. Accordingly, the present invention addresses this problem, and offers more projected inlet area for deployment than for flight, resulting in smooth, beautiful openings with slower progression of inflation and reduced drag in flight.

Figure 1:
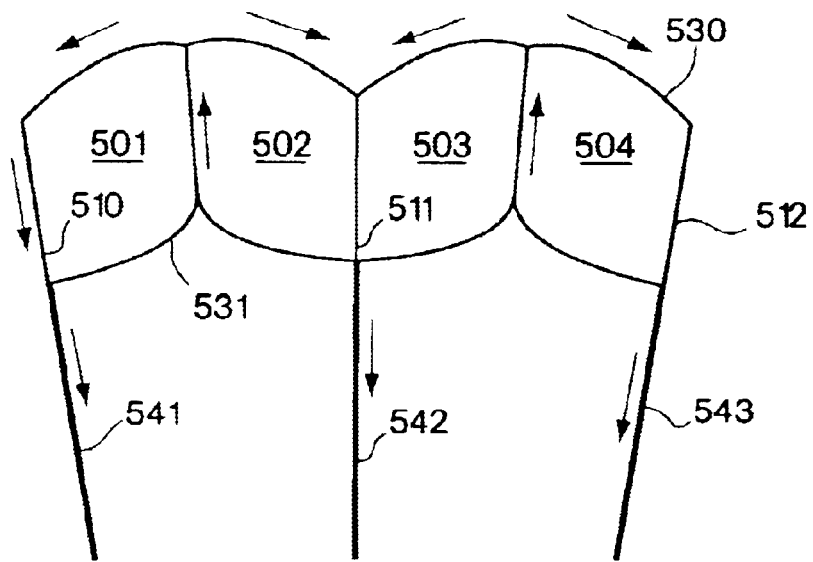
FIG. 1 is a cross section view of cells in a non-cross braced canopy of the prior art.
Figure 2:
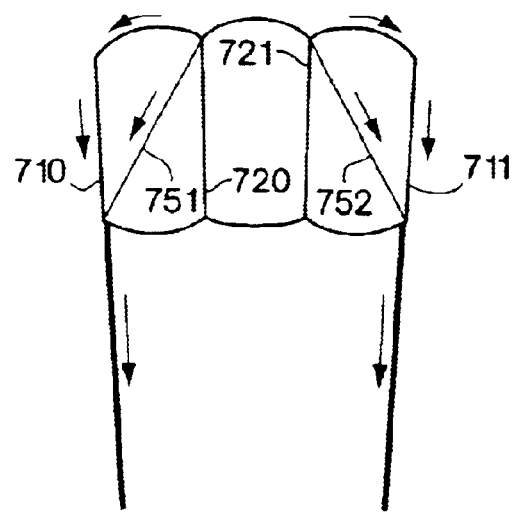
FIG. 2 is a cross section view of cells in a tri-cell canopy of the prior art.
Figure 3:
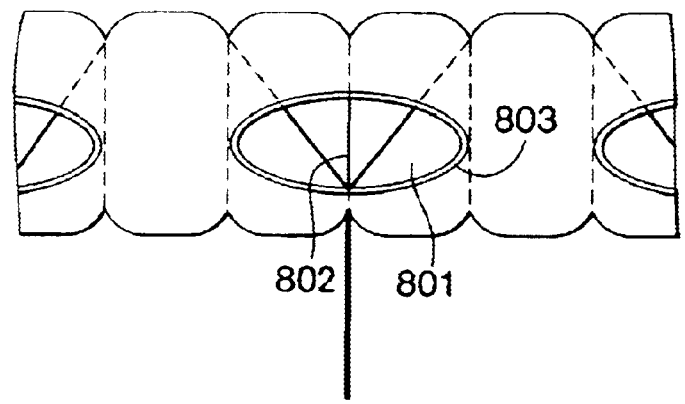
FIG. 3 is a front view of a first formed nose of the prior art.
Figure 4:
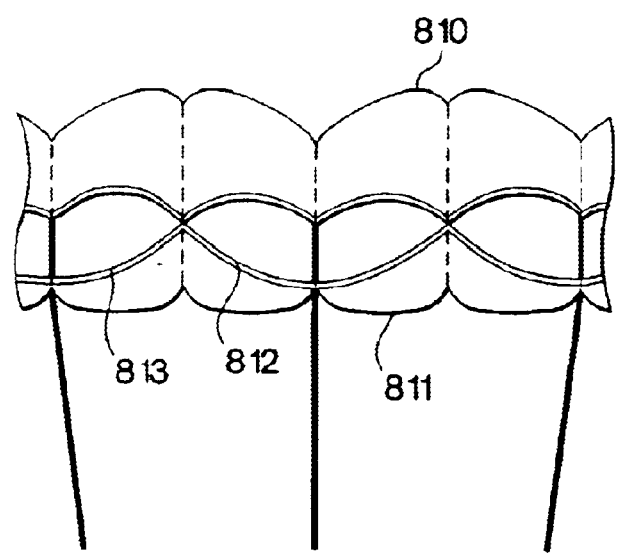
FIG. 4 is a front view of a second formed nose of the prior art.

According to another aspect of the invention, spanwise spreading of the canopy is controlled on the formed nose canopy. Typically, a formed nose canopy includes reinforcing tape only around the inlets. According to the present invention, as illustrated in FIG. 4, a continuous, structural fabric tape 100 is stitched along the entire leading edge of the top skin above all of the formed inlets. The structural fabric tape 100 is woven, cut and oriented to minimize stretch along the leading edge of canopy. During flight, the ram air canopy tends to stretch along it span. Since the structural fabric tape 100 is a continuous piece it limits the span-wise stretch. Using a structural fabric tape in a line across the top skin at the nose of a ram air parachute, the aerodynamics of the parachute canopy are improved. The reduction in span-wise stretching from use of the structural fabric tape maintains the designed airfoil shape of the canopy. Also, the added strength along the front edge of the canopy helps to prevent nose deformation from front wind and span-wise distortion from differences in loaded in non-loaded ribs. Furthermore, a canopy changes performance over time as the fabric stretches and wears. The leading edge of the top skin suffers significant stretch and wear, which limits the useful life of the canopy. The structural fabric 100 along the leading edge of the top skin limits stretching and slows wearing, which allows the parachute to substantially maintain its performance and to extend its service life.

Reinforcement of other edges of the canopy also assists in maintaining a proper shape, improving performance and extending the useful life of a canopy. Structural fabric tape may also be sewn along the trailing edge of the top skin to prevent stretching and spreading of the rear of the canopy. The span-wise reinforcement of the leading and trailing edges of the top skin helps to maintain the desired airfoil shape of the ram air canopy without the need for extensive cord-wise cross bracing. Thus, the weight and pack volume of the canopy is significantly reduced.

While the present inventions have been described with a certain degree of particularity, it is obvious from the foregoing detailed description that one skilled in the art may make one or more modifications which are suggested by the above descriptions of the novel embodiments.

What is claimed is:

1. A ram air parachute comprising:
   a top skin;
   a bottom skin opposite the top skin;
   a plurality of alternating loaded and non-loaded ribs disposed between the top skin and the bottom skin to form a plurality of cells;
   a plurality of suspension lines connected to the loaded ribs;
   wherein the top skin and bottom skin are separated at a front edge to form a plurality of substantially rectangular inlets corresponding to the plurality of cells; and
   a plurality of triangle members, each triangle member being connected along a first edge thereof to the front edge the top skin and having a vertex opposite the first edge at a location where a rib meets the front edge of the bottom skin so as to obstruct a portion of the inlet.

2. The ram air parachute of claim 1, wherein the plurality of triangle members are dimensioned to tension the top skin when the ram air parachute is inflated.

3. The ram air parachute of claim 2, wherein the plurality of triangle members are dimensioned to tension an edge of the triangle member from the vertex at the location where a loaded rib meets the front edge of the bottom skin to the top skin and to tension the top skin from the triangle member to a top point where the top skin attaches to a non-loaded rib.

4. The ram air parachute of claim 1, wherein each of the plurality of triangle members has a second vertex along the top skin at a location of a vertex of another one of the plurality of triangle members.

5. The ram air parachute of claim 1, wherein each of the plurality of triangle members having a vertex at a non-loaded rib intersects an edge of an adjacent triangle member away from the top skin.

6. The ram air parachute of claim 1, wherein the plurality of triangle members are formed as extensions of the top skin.

7. The ram air parachute of claim 1, wherein the front edge of the bottom skin has a zig-zag pattern such that the bottom skin extends further at locations of non-loaded ribs than at locations of loaded ribs.

8. A ram air parachute comprising:
   a top skin;
   a bottom skin opposite the top skin;
   a plurality of ribs disposed between the top skin and the bottom skin to form a plurality of cells, wherein a first set of the plurality of ribs are loaded ribs and a second set of the plurality of ribs are non-loaded ribs;
   a plurality of suspension lines connected to the loaded ribs;
   a front edge of the bottom skin has a zig-zag pattern such that the bottom skin extends further at locations of non-loaded ribs than at locations of loaded ribs.

* * * * *